United States Patent [19]
Takiguchi et al.

[11] Patent Number: 4,748,199
[45] Date of Patent: * May 31, 1988

[54] LOW FUEL CONSUMPTION TIRE WITH ALL WEATHER PERFORMANCES

[75] Inventors: Eiji Takiguchi; Kazuaki Yuto, both of Higashimurayama; Toru Oniki, Higashikurume, all of Japan

[73] Assignee: Bridgestone Corporation, Tokyo, Japan

[*] Notice: The portion of the term of this patent subsequent to Feb. 3, 2004 has been disclaimed.

[21] Appl. No.: 721,741

[22] Filed: Apr. 10, 1985

[30] Foreign Application Priority Data

Apr. 10, 1984 [JP] Japan .................................. 59-69912

[51] Int. Cl.$^4$ ............................................. B60C 1/00
[52] U.S. Cl. ................................ 524/318; 152/209 R; 524/145; 524/297; 524/306; 524/495
[58] Field of Search ................... 152/209 R; 524/495, 524/496, 296, 295, 297, 306, 315, 145, 317, 318, 320; 106/307; 525/237, 236

[56] References Cited

U.S. PATENT DOCUMENTS

| 3,973,983 | 8/1976 | Jordan et al. | 106/307 |
|---|---|---|---|
| 4,154,277 | 5/1979 | Sato et al. | 524/496 |
| 4,229,325 | 10/1980 | Thaler et al. | 524/296 |
| 4,261,403 | 4/1981 | Imai et al. | 152/209 R |
| 4,281,703 | 8/1981 | Ahmad | 524/496 |
| 4,433,094 | 2/1984 | Ogawa et al. | 152/209 R |
| 4,485,205 | 11/1984 | Fujimaki et al. | 152/209 R |
| 4,499,228 | 2/1985 | Ogawa et al. | 525/237 |
| 4,510,291 | 4/1985 | Kawakami | 152/209 R |

FOREIGN PATENT DOCUMENTS 0100150 6/1982 Japan .................................. 524/317

Primary Examiner—Michael Ball
Attorney, Agent, or Firm—Sughrue, Mion, Zinn, Macpeak, and Seas

[57] ABSTRACT

Disclosed herein is a low fuel consumption pneumatic tire with all weather running performances, which tire uses as a tread a vulcanizable rubber composition obtained by adding 30–80% by weight of carbon black having an iodine adsorption value of not less than 70 mg/g and a dibutylphthalate (DBP) adsorption of not less than 90 ml/100 g, and a low temperature plasticizing ester and/or naphthenic or paraffinic solftener in an amount 2 to 50% by weight relative to said carbon black into 100 parts by weight of a rubber component composed of 100 to 25 parts by weight of at least one kind of a first diene rubber containing 0 to 30% of styrene and 25 to 95% of vinyl bonds in the butadiene unit and 0 to 75 parts by weight of at least one kind of a second diene rubber which is different in kind from the above first diene rubber.

8 Claims, 2 Drawing Sheets

LOW FUEL CONSUMPTION TIRE WITH ALL WEATHER PERFORMANCES

BACKGROUND OF THE INVENTION (1) Field of the Invention

The present invention relates to a pneumatic tire, and more particularly, the invention relates to a low fuel consumption tire with all weather running performances in which particularly, wet skid resistance, rolling resistance, wear resistance and running performance on ice and snow road are remarkably improved.

(2) Description of Prior Art

Since a styrene-butadiene copolymer rubber is excellent in wet skid resistance on wet roads and wear resistance, this rubber has been heretofore used widely for the treads of the tires. However, when such styrene-butadiene copolymer rubber is used, the tread is difficult to be applied to low fuel consumption tires because energy loss is large, heat is likely to be generated, and energy loss in rolling is large. Further, since the rubber hardening is conspicuous at a low temperature, the skid performance on the ice and snow road is deteriorated and the application of this rubber to the tire for use in the snow and ice road is not desirable.

As the method of simultaneously improving the wet skid resistance, the heat generation, and the rolling resistance, Japanese Patent Application Laid-Open No. 51,503/1982, Japanese Patent Application Laid-Open No. 55,204/1982, and Japanese Patent Application Laid-Open No. 36,705/1982 disclose the use of styrene-butadiene rubber (SBR) in which the contents of bound styrene and vinyl bonds are controlled. This SBR exhibits an excellent wet skid resistance and low fuel consumption, but the glass transition temperature (Tg) is high and the rubber hardening is rapid and conspicuous at a low temperature. Further, the deterioration in the brittle fracture performance at a low temperature is observed, thereby resulting in the deteriorated skid performance on the snow and ice road.

On the other hand, although there have been proposed various pneumatic tires suitable for the snow and ice roads, the performances thereof are not necessarily satisfactory, and still desired to be improved. In this connection, examination has been heretofore made on the material of the tread member to enhance the tread-gripping force on the snow and ice roads. The techniques of reducing the hardness of rubber at low temperatures are well known from C. S. Wilkinson; RCT, 27 255 (1954), F. S. Conant; RCT 22 863 (1949); and so on. For instance, as known from the literatures such as W. G. Nörich: The friction of Polymer on Ice (Journal of the IRI, pp 192, October, 1972), Desmond Moore; The friction of Pneumatic Tires (1975) and so on, when butadiene rubber (BR), natural rubber (NR), and/or polyisoprene rubber (IR) is used as the tread rubber, the tread-gripping force on the snow and ice road is improved. However, such method unfavorably lowers the tread-gripping force on the wet roads. In order to mitigate the reduction in the tread-gripping force, as disclosed in the literatures such as A. C. Bassi; RCT 381 965, D. Bulgin, G. D. Hubberd, M. H. Walters; Proc. 4th Rubber Tech. Conf. London 193 (1962) and so on, there has been known a method of using a large amount of styrene-butadiene copolymer rubber, butyl rubber or carbon black. However, such a method unfavorably lowers the snow and ice performances and increases the rolling resistance.

Moreover, Japanese Patent Publication No. 46,257/1983 discloses that the ice skid resistance, the wet skid resistance and the wear resistance are enchanced by using in the tires for trucks and buses a tread rubber composition in which a three kind rubber blend of NR, SBR containing not more than 20% by weight of styrene and BR is added with an extender oil of a flowing point of not more than $-10°$ C. in an amount of 20% by weight relative to all the extender oil. When such a tread rubber composition is used, the ice skid resistance, the wet skid resistance and the wear resistance of the truck and bus tires are improved to some extent, but the low fuel consumption, the wet skid resistance and the snow/ice road running performances which are aimed at in the present invention and are required mainly in the tires for passagers cars are considered to be still insufficient in light of the required levels thereof.

The present inventors et al proposed in Japanese Patent Application No. 79,406/1983 and Japanese Patent Application No. 79,407/1983 a pneumatic tire using a rubber composition containing a low temperature plasticizing ester in the tread with view to drastically enhancing the tread-gripping force on the snow and ice roads without lowering the wet skid resistance, the wear resistance, and increasing the rolling resistance.

Although the wet skid resistance and the rolling resistance are desired to be further improved in order to develop the low fuel consumption tire with the so-called all weather running performance in which the rolling resistance, the wet skid resistance, and the snow-/ice road running performances are further improved, it is an actual situation that there has been available up to now no such a low fuel consumption tire with all the weather running performances.

SUMMARY OF THE INVENTION

It is therefore an object of the present invention to provide a low fuel consumption tire with all weather running performances which is free from the above drawbacks possessed by the prior art.

More specifically, the object of the present invention is to provide a low fuel consumption tire with all weather running performances in which the wet skid resistance, the rolling resistance, the wear resistance and the snow/ice road running performances are conspicuously improved.

Upon having made strenuous studies on the material of the tire tread to accomplish the above object, the present inventors have confirmed that a low fuel consumption pneumatic tire with all weather running performances which satisfies all the above-mentioned requirements by forming a tread with a vulcanizable rubber composition obtained by adding 30–80% by weight of carbon black having an iodine adsorption value (IA) of not less than 70 mg/g and a dibutylphthalate (DBP) absorption of not less than 90 ml/100 g, and a low temperature plasticizing ester and/or naphthenic or paraffinic softener in an amount of 2 to 50% by weight relative to said carbon black into 100 parts by weight of a rubber component composed of 100 to 25 parts by weight of at least one diene rubber (SBR or BR; hereinafter referred to as "diene rubber $-A$") containing 0 to 30% of styrene and 25 to 95% of vinyl bonds at the butadiene unit and 0 to 75 parts by weight of at least one diene rubber (NR, IR, other BR, other SBR) which is different in kind from the above diene rubber —A.

These and other objects, features and advantages of the invention will be well appreciated upon reading of the following description of the invention when taken in connection with the attached drawings with understanding that some modifications, variations and changes of the same could be easily made by the skilled in the art to which the invention pertains without departing from the spirit of the invention or the scope of claims appended hereto.

BRIEF DESCRIPTION OF THE DRAWINGS

For the better understanding of the invention, reference is made to the attached drawings, wherein.

DETAILED DESCRIPTION OF THE INVENTION

Figure 1:
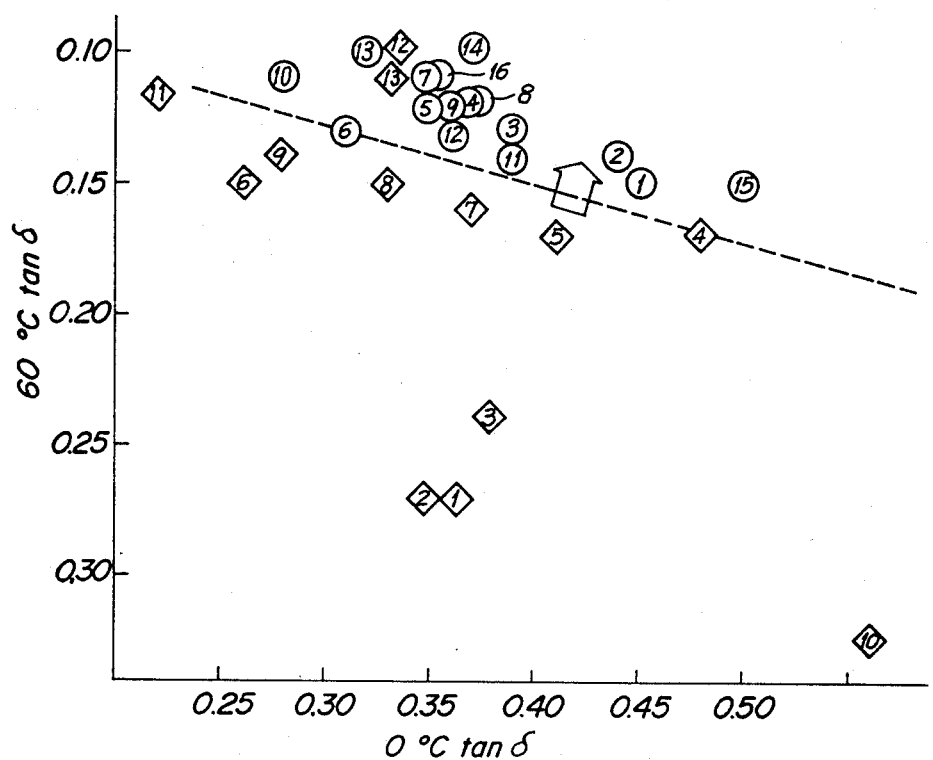
FIG. 1 is a graph showing the relationship between 0° C. tan $\delta$ and 60° C. tan $\delta$ of rubber compositions in Examples.

The present invention is characterized in that a tread member is constituted by a vulcanizable rubber composition obtained by adding 30–80% by weight of carbon black having an iodine adsorption value (IA) of not less than 70 mg/g and a dibutylphthalade (DBP) absorption of not less than 90 ml/100 g, a low temperature plasticizing ester and/or naphthenic or paraffinic softener in such an amount of 2–50% relative to said carbon black into 100 parts by weight of a rubber component composed of 100 to 25 parts by weight of at least one diene rubber (SBR or BR; hereinafter referred to as "diene rubber —A") containing 0–30% of styrene and 25 to 95% of vinyl bonds at the butadiene unit and 0–75 parts by weight of at least one diene rubber (NR, IR, other BR, other SBR) which is different in kind from the above diene rubber —A). As a raw rubber, use is made of the above diene rubber —A alone or a blend of the diene rubber —A and other kinds of diene rubber. In this case, the diene rubber —A preferably contains 0 to 30% of styrene and 25–95% of vinyl bonds at the butadiene unit. If the vinyl bond is less than 25%, the wet skid resistance is unfavorably lowered, while if the styrene is more than 30% and the vinyl bond is more than 95%, the rolling resistance and snow/ice road running performances are unfavorably deteriorated, respectively. If the diene rubber —A is less than 25 parts by weight, the set skid resistance and the rolling resistance are both deteriorated in performances.

The relation between the content of the bound styrene and the content of the vinyl bond of the diene rubber —A is a factor which largely contributes to the wet skid resistance, the rolling resistance and the snow/ice road running performances. Among them, the content of the styrene more largely contributes thereto. The content of the styrene is represented by weight % relative to the whole diene rubber —A, and therefore can be independently considered. But, as the content of the bound styrene varies, the content of butadiene varies. Since content of the vinyl bond (1,2-bond) is represented by the weight % in the butadiene unit, it is apparently influenced by the content of the bound styrene. For this reason, the conditions under which the wet skid resistance and the rolling resistance are satisfied can be represented by the content of the bound styrene and the content of the vinyl bond as a function of the bound styrene content. As a result of the investigation, in the case of the diene rubber —A in which the content of the bound styrene is 0–30% by weight, and the content of vinyl bond in the butadiene unit is 25 to 95% by weight, it was proved that the conditions can be approximated in the following formula:

$$45 \leq 1.7 \times \text{styrene content (weight \%)} + \text{vinyl bond content (weight \%)} \leq 120$$

That is, if the above range is met, the wet skid resistance, the rolling resistance and the snow/ice road running performances can be simultaneously satisfied when the low temperature plasticizing ester and/or naphthenic or paraffinic softener are used in the combined use relation as mentioned above. If the value is less than 45, unfavorably the wet skid resistance is lowered, and can no longer be improved even if the blending factors such as combined use of carbon black, oil and other polymer are changed. If the value exceeds 120, unfavorably the rolling resistance can in its turn no longer be improved even when other factors are changed.

the above-recited approximate formula is preferably $$65 \leq 1.7 \times \text{styrene content (weight \%)} + \text{vinyl bond content (weight \%)} \leq 120$$

When the value of "1.7×styrene content (weight %)+vinyl bond content (weight %)" is set higher within the above range, the performances can be preferably well balanced by setting the combined use ratio of the low temperature plasticizing ester and so on higher.

As the diene rubber —A, it is preferable to use 100 to 40 parts by weight of the diene rubber —A containing 0 to 30% of styrene and 25 to 70% of vinyl bond, preferably 5 to 25% of styrene and 35 to 70% of vinyl bond, more preferably 10 to 25% of styrene and 45 to 70% of vinyl bond. As mentioned above, when the ratio of the vinyl bond is smaller, the wet skid resistance is insufficient. Even when 100 parts by weight of the diene rubber —A is used, the wet skid resistance is insufficient. As the content of styrene and the vinyl bond are increased, the combined use with other diene rubber is possible. It is preferable to use up to 40 parts by weight of the diene rubber —A.

Further, with respect to the diene rubber —A, other diene rubber may be used in combination with 6 to 25 parts by weight of the diene rubber —A containing 0 to 30% of styrene and 70 to 95% of vinyl bond, preferably 0 to 20% of styrene and 70 to 90% of vinyl bond, and more preferably 0 to 15% of styrene and 70 to 90% of vinyl. If the content is more than 60 parts by weight, the snow/ice road running performances and the low temperature brittleness are unfavorably deteriorated. If the content is less than 25 parts by weight, the wet skid resistance is insufficient.

In addition, it is also possible to use two or more kinds of the diene rubber —A, and a blend of the diene rubber —A of 25 to 70% of vinyl bond and that of 70 to 95% vinyl bond.

Next, according to the present invention, in order to enhance the tread-gripping force on the snow and ice road and at the same time lower the rolling resistance, it is important to blend the low temperature plasticizing ester and/or the naphthenic or paraffinic softener with the above raw rubber. The addition amount of the former is preferably 2 to 50% by weight, more preferably 2 to 30% by weight relative to the blended carbon black. If the addition amount is less than 2% by weight, improving effects upon the snow and ice road running performances and the rolling resistance are smaller, while if it exceeds 50% by weight, the wear resistance, permanent set of the rubber and the cut appearance on the bad road running becomes poorer, and the effect of improving the rolling resistance disappears.

Particularly, it is preferable to use the plasticizing ester in combination because it favorably has large effects upon the snow/ice road running performances, and the rolling resistance. As such a low temperature plasticizer, mention may be made of the plasticizing esters, for instance, phthalic acid derivatives such as a phthalic acid diester, a fatty acid type monobasic acid ester such as an oleic acid derivative, a fatty acid dibasic acid ester such as an adipic acid derivative, an azelaic acid derivative, a sebacic acid derivative, and a phosphoric acid derivative. Oleic acid derivative is most preferred. For instance, butyl oleate, octyl oleate, decyl oleate, octyl tall oil fatty acid, oleyl oleate, ethylene glycol oleic acid diester, 1,4-butane diol oleic acid diester, 1,6-hexanediol oleic acid diester, 2-ethylhexyl oleate, dodecyl oleate, decyl myristoleate, and oleyl myristoleate are recited. Among them, octyl oleate is most preferred.

The naphthenic and paraffinic softeners contain not more than 30% of aromatic hydrocarbon, and have the viscosity gravity constant (VGC) of not more than 0.900, and mention may be made, for instance, of Sonic Process Oil P-200, R-1000 and R-2000 (manufactured by Kyodo Sekiyu Co., Ltd.), Diana Process Oil KL-2P, MM-45, KL-1 and KM-90 (manufactured by Idemitsu Kosan Co., Ltd.), Mitsubishi 10 Light Process Oil, Mitsubishi 12 Medium Process Oil, and Mitsubishi 20 Light Process Oil (manufactured by Mitsubishi Oil Co., Ltd.) and the like.

Upon necessity, tackifier, aromatic softener containing not less than 30% of aromatic hydrocarbon and having VGC of not less than 0.900 and so on may be added.

Carbon black having the iodine adsorption value of not less than 70 mg/g and DBP absorption of not less than 90 ml/100 g is compounded into the rubber composition used in the present invention. If the iodine adsorption value and DBP adsorption are less than the above respective ranges, the wear resistance is unfavorably lowered. The carbon black is compound in a range of 30 to 80 parts by weight with respect to 100 parts by weight of the rubber component. If carbon black is less than 30 parts by weight, the wear resistance is lowered, while if the content is over 80 parts by weight, the rolling resistance and snow/ice road running performances are unfavorably deteriorated.

Further, compounding agent ordinarily used in the rubber composition, such as vulcanizer, accelerator, activator and antioxidant and so on may be appropriately compounded into the above-mentioned rubber composition.

The object of the present invention can be accomplished by forming the tread with the above-constituted rubber composition, and it is important in controlling the snow/ice performances that $-20°$ C.E' is not more than 260 kg.cm$^2$, preferably not more than 220 kg/cm$^2$, 0° C.E' is not more than 170 kg/cm$^2$, and preferably 140 kg/cm$^2$, and it is important in maintaining the snow/ice performances under various circumstances that the change in E' is small in such a temperature range. E' is a storage modulus.

Favorably, in order to control wet skid resistance performances, the 0° C. loss tangent (tan δ) is not less than 0.30, preferably not less than 0.33, and in order to control the rolling resistance, the 60° C. tan δ is not more than 0.22, and preferably not more than 0.19.

As a method of further reducing the rolling resistance without damaging the snow/ice road running performances and the wet skid resistance, the above performances are favorably much more enhanced by introducing the cap tread rubber/base tread rubber structure.

The present invention will be explained more in detail with reference to the following examples, which are given merely illustrative of the invention, but never interpreted to limit the scope thereof.

EXAMPLES

In Table 1 are shown the compounding recipes (parts by weight) of rubber compositions.

TABLE 1(a)

| | Bound styrene content % | Butadiene unit % | | | Bound styrene % × 1.7 + vinyl % | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|---|---|---|
| | | cis −1,4 | trans −1,4 | vinyl | | | | | | | | |
| SBR-1 | 25.0 | 10 | 33 | 48 | 90.5 | | | | | | | 50 |
| 2 | 25.0 | 25 | 42 | 33 | 75.5 | | | | | 100 | | |
| 3 | 20 | 13 | 22 | 65 | 99.0 | | | | 100 | | | |
| 4 | 10.0 | 7 | 14 | 79 | 96.0 | | | | | | | |
| 5 | 18.0 | 24 | 45 | 31 | 61.6 | | | | | | | |
| 6 | 25.0 | 6 | 10 | 84 | 126.5 | | | | | | | |
| 7 | 23.5 | 16 | 66 | 18 | 58.0 | 50 | 50 | 100 | | | | |
| 8 | 12.0 | 17 | 65 | 18 | 38.4 | | | | | | 100 | |
| BR-9 | 0 | 95 | 3 | 2 | 2 | 50 | 20 | | | | | |
| 10 | 0 | 3 | 6 | 91 | 91 | | | | | | | |
| NR (RSS#4) | | | | | | | | 30 | | | | 50 |
| IR (JSR IR 1500) | | | | | | | | | | | | |

TABLE 1(b)

| | Iodine adsorption value | DBP absorption | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|
| N 339 | 89 | 121 | 85 | 95 | 60 | 50 | 50 | 50 | 50 |
| N 330 | 82 | 103 | | | | | | | |

TABLE 1(b)-continued

| | Iodine adsorption value | DBP absorption | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|
| N 550 | 42 | 120 | | | | | | | |
| N 326 | 83 | 70 | | | | | | | |
| Aromatic oil | | | 40 | 37 | 15 | 6 | 6 | 6 | 6 |
| Naphthenic oil | | | | 10 | | | | | |
| Butyl oleate | | | | | | | | | |
| Dioctyl phthalate | | | | | | | | | |
| Stearic acid | | | 1 | 1 | 1 | 1 | 1 | 1 | 1 |
| Zinc oxide | | | 3 | 3 | 3 | 3 | 3 | 3 | 3 |
| Antioxidant IPPD | | | 1 | 1 | 1 | 1 | 1 | 1 | 1 |
| Vulcanization accelerator DPG | | | 0.3 | 0.3 | 0.3 | 0.3 | 0.3 | 0.3 | 0.1 |
| Vulcanization accelerator DM | | | 0.3 | 0.3 | 0.4 | 0.4 | 0.4 | 0.4 | 0.3 |
| Vulcanization accelerator Nobs | | | 1.0 | 0.9 | 0.4 | 0.4 | 0.4 | 0.4 | 0.5 |
| Sulfur | | | 1.8 | 1.8 | 1.8 | 1.8 | 1.8 | 1.8 | 1.8 |

TABLE 1(c)

| | Bound styrene content % | Butadiene unit % cis −1,4 | Butadiene unit % trans −1,4 | vinyl | Bound styrene % × 1.7 + vinyl % | Comparative Example 8 | Comparative Example 9 | Example 1 | Example 2 | Example 3 | Example 4 | Example 5 |
|---|---|---|---|---|---|---|---|---|---|---|---|---|
| SBR-1 | 25.0 | 19 | 33 | 48 | 90.5 | | | | | | 100 | 50 |
| 2 | 25.0 | 25 | 42 | 33 | 75.5 | 50 | | | | | | |
| 3 | 20 | 13 | 22 | 65 | 99.0 | | | 100 | 100 | | | |
| 4 | 10.0 | 7 | 14 | 79 | 96.0 | | | | | 100 | | |
| 5 | 18.0 | 24 | 45 | 31 | 61.6 | | 50 | | | | | |
| 6 | 25.0 | 6 | 10 | 84 | 126.5 | | | | | | | |
| 7 | 23.5 | 16 | 66 | 18 | 58.0 | | | | | | | |
| 8 | 12.0 | 17 | 65 | 18 | 38.4 | | | | | | | |
| BR-9 | 0 | 95 | 3 | 2 | 2 | | | | | | | |
| 10 | 0 | 3 | 6 | 91 | 91 | | | | | | | |
| NR (RSS#4) | | | | | | 50 | 50 | | | | | 50 |
| IR (JSR IR 1500) | | | | | | | | | | | | |

TABLE 1(d)

| | Iodine adsorption value | DBP absorption | Comparative Example 8 | Comparative Example 9 | Example 1 | Example 2 | Example 3 | Example 4 | Example 5 |
|---|---|---|---|---|---|---|---|---|---|
| N 339 | 89 | 121 | 50 | 50 | 50 | 50 | 50 | 50 | 50 |
| N 330 | 82 | 103 | | | | | | | |
| N 550 | 42 | 120 | | | | | | | |
| N 326 | 83 | 70 | | | | | | | |
| Aromatic oil | | | 6 | 6 | | | | | |
| Naphthenic oil | | | | | 6 | 2 | | | |
| Butyl oleate | | | | | | | 4 | 6 | 3 |
| Dioctyl phthalate | | | | | | 6 | | | |
| Stearic acid | | | 1 | 1 | 1 | 1 | 1 | 1 | 1 |
| Zinc oxide | | | 3 | 3 | 3 | 3 | 3 | 3 | 3 |
| Antioxidant IPPD | | | 1 | 1 | 1 | 1 | 1 | 1 | 1 |
| Vulcanization accelerator DPG | | | 0.1 | 0.1 | 0.3 | 0.3 | 0.3 | 0.3 | 0.1 |
| Vulcanization accelerator DM | | | 0.3 | 0.3 | 0.4 | 0.4 | 0.4 | 0.4 | 0.3 |
| Vulcanization accelerator Nobs | | | 0.5 | 0.5 | 0.4 | 0.4 | 0.4 | 0.4 | 0.5 |
| Sulfur | | | 1.8 | 1.8 | 1.8 | 1.8 | 1.8 | 1.8 | 1.8 |

TABLE 1(e)

| | Bound styrene content % | Butadiene unit % cis −1,4 | Butadiene unit % trans −1,4 | vinyl | Bound styrene % × 1.7 + vinyl % | Example 6 | Example 7 | Example 8 | Example 9 | Example 10 | Example 12 | Example 13 |
|---|---|---|---|---|---|---|---|---|---|---|---|---|
| SBR-1 | 25.0 | 19 | 33 | 48 | 90.5 | | | | | | | |
| 2 | 25.0 | 25 | 42 | 33 | 75.5 | 50 | 75 | | | | | |
| 3 | 20 | 13 | 22 | 65 | 99.0 | | | 50 | | | | |
| 4 | 10.0 | 7 | 14 | 79 | 96.0 | | | | 50 | | | |
| 5 | 18.0 | 24 | 45 | 31 | 61.6 | | | | | 65 | | |
| 6 | 25.0 | 6 | 10 | 84 | 126.5 | | | | | | 50 | |
| 7 | 23.5 | 16 | 66 | 18 | 58.0 | | | | | | | |
| 8 | 12.0 | 17 | 65 | 18 | 38.4 | | | | | | | |
| BR-9 | 0 | 95 | 3 | 2 | 2 | | | | | | | |
| 10 | 0 | 3 | 6 | 91 | 91 | | | | | | | 50 |
| NR (RSS#4) | | | | | | 50 | 25 | 50 | 50 | 35 | 50 | 50 |

TABLE 1(e)-continued

| Bound styrene content % | Butadiene unit % cis -1,4 | Butadiene unit % trans -1,4 | vinyl | Bound styrene % × 1.7 + vinyl % | Example 6 | Example 7 | Example 8 | Example 9 | Example 10 | Example 12 | Example 13 |
|---|---|---|---|---|---|---|---|---|---|---|---|
| | IR (JSR IR 1500) | | | | | | | | | | |

TABLE 1(f)

| | Iodine adsorption value | DBP absorption | Example 6 | Example 7 | Example 8 | Example 9 | Example 10 | Example 11 | Example 12 |
|---|---|---|---|---|---|---|---|---|---|
| N 339 | 89 | 121 | 50 | 50 | 50 | 50 | 50 | 50 | 50 |
| N 330 | 82 | 103 | | | | | | | |
| N 550 | 42 | 120 | | | | | | | |
| N 326 | 83 | 70 | | | | | | | |
| Aromatic oil | | | 3 | | 3 | 3 | 3 | 3 | 3 |
| Naphthenic oil | | | 3 | 3 | | | | | |
| Butyl oleate | | | | 3 | | 3 | 3 | 3 | 3 |
| Cioctyl phthalate | | | | | 3 | | | | |
| Stearic acid | | | 1 | 1 | 1 | 1 | 1 | 1 | 1 |
| Zinc oxide | | | 3 | 3 | 3 | 3 | 3 | 3 | 3 |
| Antioxidant IPPD | | | 1 | 1 | 1 | 1 | 1 | 1 | 1 |
| Vulcanization accelerator DPG | | | 0.1 | 0.2 | 0.1 | 0.1 | 0.1 | 0.1 | 0.1 |
| Vulcanization accelerator DM | | | 0.3 | 0.3 | 0.3 | 0.3 | 0.3 | 0.3 | 0.3 |
| Vulcanization accelerator Nobs | | | 0.5 | 0.5 | 0.5 | 0.5 | 0.5 | 0.5 | 0.5 |
| Sulfur | | | 1.8 | 1.8 | 1.8 | 1.8 | 1.8 | 1.8 | 1.8 |

TABLE 1(g)

| | Bound styrene content % | Butadiene unit % cis -1,4 | Butadiene unit % trans -1,4 | vinyl | Bound styrene % × 1.7 + vinyl % | Comparative Example 10 | Comparative Example 10 | Example 13 | Example 14 | Example 15 | Comparative Example 16 | Comparative Example 12 | Comparative Example 13 |
|---|---|---|---|---|---|---|---|---|---|---|---|---|---|
| SBR-1 | 25.0 | 19 | 33 | 48 | 90.5 | | | | | | 50 | 50 | 50 |
| 2 | 25.0 | 25 | 42 | 33 | 75.5 | | | | 50 | | | | |
| 3 | 20 | 13 | 22 | 65 | 99.0 | 100 | | | | | | | |
| 4 | 10.0 | 7 | 14 | 79 | 96.0 | | | | | | | | |
| 5 | 18.0 | 24 | 45 | 31 | 61.6 | | | | 30 | 30 | | | |
| 6 | 25.0 | 6 | 10 | 84 | 126.5 | | | | | | 80 | | |
| 7 | 23.5 | 16 | 66 | 18 | 58.0 | | | | | | | | |
| 8 | 12.0 | 17 | 65 | 18 | 38.4 | | 20 | | | 20 | | | |
| BR-9 | 0 | 95 | 3 | 2 | 2 | | 30 | | | | | | |
| 10 | 0 | 3 | 6 | 91 | 91 | | | | 60 | | | | |
| NR (RSS#4) | | | | | | | 50 | 20 | | | 50 | 50 | 50 |
| IR (JSR IR 1500) | | | | | | | | 10 | | | | | |

TABLE 1(h)

| | Iodine adsorption value | DBP absorption | Comparative Example 10 | Comparative Example 11 | Example 13 | Example 14 | Example 15 | Comparative Example 16 | Comparative Example 12 | Comparative Example 13 |
|---|---|---|---|---|---|---|---|---|---|---|
| N 339 | 89 | 121 | 95 | 50 | 50 | 50 | 50 | | | |
| N 330 | 82 | 103 | | | | | | 50 | | |
| N 550 | 42 | 120 | | | | | | | 50 | |
| N 326 | 83 | 70 | | | | | | | | 50 |
| Aromatic oil | | | 43 | 3 | | | | 3 | 3 | 3 |
| Naphthenic oil | | | | 3 | 2 | | 2 | | | |
| Butyl oleate | | | 4 | | 4 | | 4 | 3 | 3 | 3 |
| Dioctyl phthalate | | | | | | 6 | | | | |
| Stearic acid | | | 1 | 1 | 1 | 1 | 1 | 1 | 1 | 1 |
| Zinc oxide | | | 3 | 3 | 3 | 3 | 3 | 3 | 3 | 3 |
| Antioxidant IPPD | | | 1 | 1 | 1 | 1 | 1 | 1 | 1 | 1 |
| Vulcanization accelerator DPG | | | 0.3 | 0.3 | 0.2 | 0.2 | 0.3 | 0.1 | 0.1 | 0.1 |
| Vulcanization accelerator DM | | | 0.3 | 0.3 | 0.3 | 0.3 | 0.3 | 0.3 | 0.3 | 0.3 |
| Vulcanization accelerator Nobs | | | 0.9 | 0.4 | 0.5 | 0.4 | 0.4 | 0.5 | 0.5 | 0.5 |
| Sulfur | | | 1.8 | 1.8 | 1.8 | 1.8 | 1.8 | 1.8 | 1.8 | 1.8 |

In Table,
SBR-1 to 6 ... solution polymerized SBR
  SBR-1 ... S-1215, manufactured by Shell (trade name)
  SBR-2 to 6 ... polymer prepared for trial (SBR-3 and -4 are SBR of a coupling type with Sn and the coupling efficiency is about 50%)
SBR-7, 8 ... Emulsion polymerized SBR
  SBR-7 ... SBR 1500 manufactured by Japan Synthetic rubber (JSR)
  SBR-8 ... Uniroyal 1504
BR-9 ... JSR BR01

BR10 ... polymer prepared for trial (polymer of a coupling type with Sn at the coupling efficiency of about 50%)
IPPO ... N-phenyl-N'-isopropyl-p-phenylenediamine
DPG ... diphenylguanidine
DM ... dibenzothiazyldisulfide
Nobs ... N-oxydiethylene-2-benzothiazoylsulpheneamide Comparative Examples 1 and 2 are ordinary composition examples for the treads of snow tires, and Comparative Example 3 is an ordinary composition example for the treads of summer tires.

With respect to the microstructure of the polymer, the content of the bound styrene was determined by using a spectrometer with reference to a calibration curve using an absorbence at 669 cm$^{-1}$, and the microstructure of the butadiene unit was determined according to D. Moreros' method (Chem. & Ind. 41 758 (1959)).

Before the tires were evaluated with respect to the rubber compositions shown in Table 1, E' at $-20°$ C. and $0°$ C. and tan $\delta$ at $0°$ C. and $60°$ C. were measured, and the Lambourn abrasion was evaluated at a slip rate of 10% and under load of 2.5 kg. Further, tires each having a tire size of 165 SR 13 and a tread selectively composed from the rubber compositions were built. With respect to the respective tires, the tread-gripping force on the snow and ice road and the tread-gripping force on the wet road (breaking performance), the wear resistance, and the rolling resistance were evaluated on an actual car in the following method.

Results obtained are shown in Table 2.

Evaluation methods:

(1) Road-gripping force on snow and ice road

A brake was trod during running at a speed of 20, 30 or 40 km/h, and a stopping distance was measured, the braking performance being shown by index taking a value of a tire of Comparative Example 1 as 100.

(2) Braking performance:

A brake was rapidly trod on a wet asphalt road from a speed of 40 km/h, 70 km/h or 100 km/h, and a running distance at which a vehicle was completely stopped was determined, and a determined value was shown by index taking a value of Comparative Example 1 as 100. The larger the figure, the better the braking performance.

(3) Rolling resistance:

While a load of 385 kg was applied onto a tire of an internal pressure of 1.7 kg/cm$^2$ on a steel drum of 1,707.6 mm in diameter and 350 mm in width, and the drum was rotated by driving a motor. After the tire was warmed up at a speed of 80 km/h for 30 minutes, the speed was raised up to 200 km/h. Then, a motor driving clutch was turned off, and the tire was let rolling. The rolling resistance between the tire and the drum at a speed of 50 km/h was calculated on the basis of the drum deceleration speed and the lapse of time. The actual tire rolling resistance was determined by substracting a preliminarily determined drum resistance from this value. The rolling resistance was shown by index taking a value of Control Example 1 as 100. The larger the figure, the better the rolling resistance.

(4) Wear resistance:

(a) Apart from the tires subjected to the evaluation of the cornering stability and the stability, a tire was built for trial by dividing a tread into two sections along a tire circumference, and forming one of the two sections with a tread rubber composition of Comparative Example 1. A wear amount after running for 20,000 km on a paved road was measured, and running distances necessary for 1 mm wearing were relatively compared with one another, the results being shown by index taking the value of Comparative Example 1 as 100. The larger the index, the better the wear resistance.

(b) The Lambourn abrasion resistance of a rubber composition was evaluated in a laboratory in the following manner:

First, a time at which the torque of the rubber composition took the maximum value was measured by a rheometer, and vulcanization was carried out for a time 1.2 times as long as thus measured time. Then, the Lambourn abrasion of the vulcanized rubber composition was evaluated at a slip rate of 10% and under load of 4.5 kg, and shown by index taking a value of Comparative Example 1 as 100. The larger the index, the better the Lambourn abrasion resistance. By using the rubber composition after this evaluation, the evaluation of the wear resistance on actual running in the above (4)(a) was carried out.

(5) Measuring ways of E' and tan $\delta$:

By using a viscoelastic spectrometer made by Iwamoto Seisakusho, the E' and tan $\delta$ were measured at a frequency of 50 Hz and a dynamic strain of 1% at a static elongation strain of 5%. A sample was shaped in a form of a strip having a length of 20 mm between chucks, a width of 5 mm and a thickness of 2 mm. The vulcanization conditions were the same as those in the above mentioned (4)(b).

TABLE 2(a)

|  |  | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|
| Spectrometer | $-20°$ C. E' (kg/cm$^2$) | 235 | 220 | 338 | 385 | 369 | 235 | 270 | 252 | 228 |
|  | $0°$ C. E' (kg/cm$^2$) | 151 | 135 | 189 | 223 | 205 | 137 | 172 | 162 | 150 |
|  | $0°$ C. tan $\delta$ | 0.36 | 0.35 | 0.38 | 0.48 | 0.41 | 0.26 | 0.37 | 0.33 | 0.28 |
|  | $60°$ C. tan $\delta$ | 0.27 | 0.27 | 0.24 | 0.17 | 0.17 | 0.15 | 0.16 | 0.15 | 0.14 |
|  | Lambourn abrasion index | 100 | 91 | 133 | 133 | 136 | 140 | 127 | 129 | 130 |
| Tire performance (all shown by index) | Rolling resistance | 100 |  | 103 | 115 | 116 | 117 | 117 |  |  |
|  | Brakability on ice | 100 |  | 85 | 77 | 80 |  | 89 |  |  |
|  | Brakability on snow | 100 |  | 83 | 79 | 82 |  | 91 |  |  |
|  | Brakability on wet road | 100 |  | 101 | 109 | 103 | 87 | 100 |  |  |
|  | Wear resistance | 100 |  | 119 | 125 | 123 |  | 116 |  |  |

TABLE 2(b)

|  |  | Example 1 | Example 2 | Example 3 | Example 4 | Example 5 | Example 6 | Example 7 | Example 8 | Example 9 | Example 10 |
| --- | --- | --- | --- | --- | --- | --- | --- | --- | --- | --- | --- |
| Spectrometer | −20° C. E' (kg/cm²) | 290 | 241 | 235 | 224 | 210 | 198 | 207 | 203 | 200 | 190 |
|  | 0° C. E' (kg/cm²) | 178 | 141 | 138 | 135 | 133 | 117 | 123 | 118 | 108 |  |
|  | 0° C. tan δ | 0.45 | 0.44 | 0.39 | 0.37 | 0.35 | 0.31 | 0.35 | 0.37 | 0.36 | 0.28 |
|  | 60° C. tan δ | 0.15 | 0.14 | 0.13 | 0.12 | 0.12 | 0.13 | 0.11 | 0.12 | 0.12 | 0.11 |
|  | Lambourn abrasion index | 128 | 126 | 126 | 129 | 124 | 124 | 129 | 123 | 120 | 132 |
| Tire performance (all shown by index) | Rolling resistance |  | 120 |  | 122 | 122 |  | 122 | 121 |  |  |
|  | Brakability on ice |  | 98 |  | 103 |  |  | 104 | 104 |  |  |
|  | Brakability on snow |  | 99 |  | 102 |  |  | 101 | 101 |  |  |
|  | Brakability on wet road |  | 104 |  | 101 | 100 |  | 99 | 102 |  |  |
|  | Wear resistance |  | 123 |  |  | 114 |  | 116 | 110 |  |  |

TABLE 2(c)

|  |  | Example 11 | Example 12 | Comparative Example 10 | Comparative Example 11 | Example 13 | Example 14 | Example 15 | Example 16 | Comparative Example 12 | Comparative Example 13 |
| --- | --- | --- | --- | --- | --- | --- | --- | --- | --- | --- | --- |
| Spectrometer | −20° C. E' (kg/cm²) | 245 | 211 | 412 | 178 | 170 | 221 | 315 | 207 | 205 | 203 |
|  | 0° C. E' (kg/cm²) | 141 | 125 | 243 | 113 | 108 | 128 | 188 | 130 | 125 | 124 |
|  | 60° C. tan δ | 0.14 | 0.13 | 0.33 | 0.12 | 0.10 | 0.10 | 0.15 | 0.11 | 0.10 | 0.11 |
|  | Lambourn abrasion index | 117 | 129 |  |  | 124 | 124 | 128 | 106 | 73 | 76 |
| Tire performance (all shown by index) | Rolling resistance |  | 119 |  | 120 | 125 | 126 |  |  |  |  |
|  | Brakability on ice |  |  |  |  | 106 |  |  |  |  |  |
|  | Brakability on snow |  |  |  |  | 105 |  |  |  |  |  |
|  | Brakability on wet road |  | 100 |  | 84 | 97 | 101 |  |  |  |  |
|  | Wear resistance |  |  |  |  | 113 |  |  |  |  |  |

Figure 2:
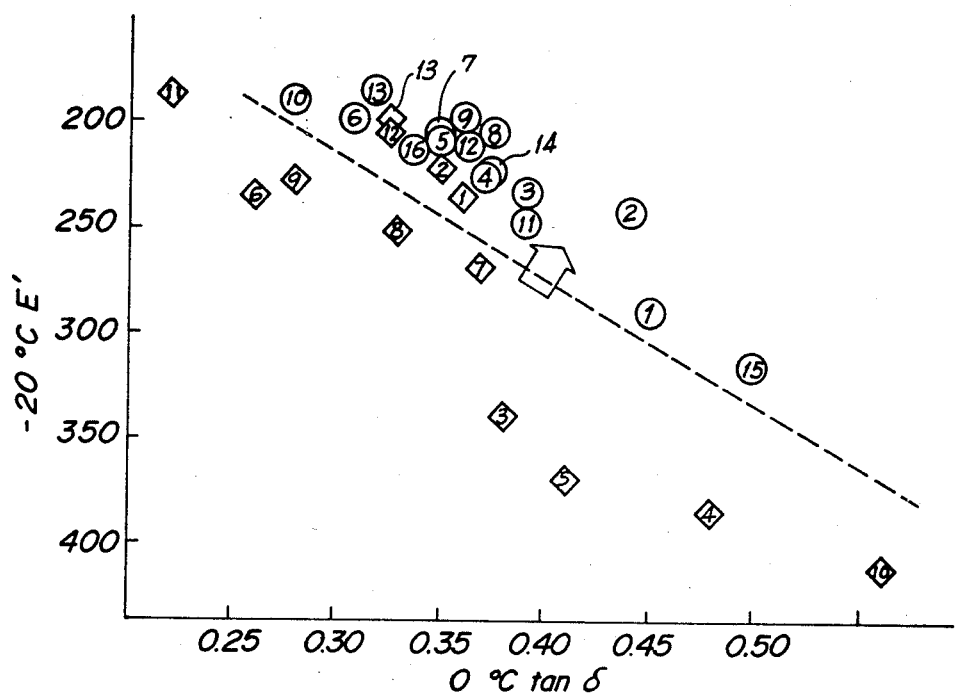
FIG. 2 is a graph showing the relationship between 0° C. tan $\delta$ and $-20°$ C.E' of the rubber compositions in Examples.

In FIG. 1 is shown the relation between 0° C. tan δ and 60° C. tan δ of the rubber composition in Table 2, and the relation between 0° C. tan δ and −20° C.E' is shown in FIG. 2. Marks "O" and "□" relate to the rubber compositions of Examples and Comparative Examples, respectively. The figures inside of the marks "O" and "□" show the numbers of Examples and Comparative Examples, respectively. The larger the figure of 0° C. tan δ, the higher the wet skid performance, and the smaller the figure of the 60° C. tan δ the smaller the rolling resistance. The smaller the figure of −20° C.E', the more suitable for the snow/ice road running the rubber composition. It is understood from FIGS. 1 and 2 that the rubber compositions of Examples 1–16 are excellent in rolling resistance, wet skid performance and as tires for use in the snow/ice road running. The relation shown in the figures shows the substantially the same tendency on the tire evaluation, too, and the performances proportional thereto were appeared.

As mentioned above, since the tires according to the present invention has a tread formed with a rubber composition in which the specific carbon black, and the low temperature plasticizing ester and/or naphthenic and paraffinic softener are compounded into the above specified diene rubber −A alone or a blend with other diene rubber as a rubber component, as seen from Table 2, the tread-gripping force on the snow and ice road and the rolling resistance are drastically improved without the tread-gripping force on the wet road and the wear resistance being damaged. Thus, the rubber composition used in the present invention is extremely effective as the low fuel consumption tire for all the weather running purpose.

What is claimed is:

1. A low fuel consumption pneumatic tire with all weather running performances, which tire uses as a tread a vulcanizable rubber composition obtained by adding 30 to 80% by weight of carbon black having an iodine adsorption value of not less than 70 mg/g and a dibutylphthalate (DBP) absorption of not less than 90 ml/100 g, and a low temperature plasticizing ester selected from the group consisting of butyl oleate and octyl oleate in an amount of 2 to 50% by weight relative to said carbon black into 100 parts by weight of rubber component composed of 100 to 25 parts by weight of at least one kind of a first diene rubber containing 0 to 30% of styrene and 25 to 95% of vinyl bonds in the butadiene unit and 0 to 75 parts by weight of at least one kind of a second diene rubber which is different in kind from the above first diene rubber, wherein said rubber composition has a dynamic storage modulus (E') at −20° C. of not more than 260 kg/cm², a loss tangent (tan δ) at 0° C. of not less than 0.30, and a loss tangent (tan δ) at 60° C. of not more than 0.22.

2. A low fuel consumption tire with all weather running performances according to claim 1, wherein the first diene rubber is one selected from styrene-butadiene rubber and butadiene rubber, and the other diene rubber is one selected from natural rubber, polyisoprene rubber, and butadiene rubber, and styrene-butadiene rubber and butadiene rubber which are different from those of the first diene rubber.

3. A low fuel consumption tire with all weather running performances according to claim 1, wherein the rubber component contains 100 to 40 parts by weight of the first diene rubber, the content of the styrene is 5 to 25% by weight, and the content of the vinyl bond is 35 to 70% by weight.

4. A low fuel consumption tire with all weather running performances according to claim 3, wherein the content of the styrene is 10 to 25 parts by weight and the content of vinyl bond is 45 to 25 parts by weight.

5. A low consumption tire with all weather running performances according to claim 1, wherein the amount of the low temperature plasticizing ester is 2 to 30% by weight with respect to the carbon black.

6. A low fuel consumption tire with all weather running performances according to claim 1, wherein the dynamic storage modulus (E′) at $-20°$ C. is not more than 220 kg/cm$^2$, and said rubber composition has a dynamic storage modulus (E′) at 0° C. of not more than 140 kg/cm$^2$.

7. A low fuel consumption tire with all weather running performances according to claim 1, wherein the loss tangent (tan δ) at 0° C. is not more than 0.33, and the loss tangent (tan δ) at 60° C. is not more than 0.19.

8. A low fuel consumption tire with all weather running performances according to claim 1, wherein $65 \leq \{$the styrene content (% by weight)+the vinyl content (% by weight)$\}$ in the first diene rubber$\leq 120$.

* * * * *